United States Patent
Kurokawa et al.

(10) Patent No.: US 6,283,369 B1
(45) Date of Patent: Sep. 4, 2001

(54) IC CARD SYSTEM AND METHOD FOR SECURING THE SYSTEM

(75) Inventors: Masanori Kurokawa, Fukaya; Toshiyuki Kawagishi, Tokyo, both of (JP)

(73) Assignee: Kabushiki Kaisha Toshiba, Kasasaki (JP)

( * ) Notice: Subject to any disclaimer, the term of this patent is extended or adjusted under 35 U.S.C. 154(b) by 0 days.

(21) Appl. No.: 09/473,043

(22) Filed: Dec. 28, 1999

Related U.S. Application Data

(62) Division of application No. 09/027,616, filed on Feb. 23, 1998, now abandoned.

(30) Foreign Application Priority Data

Feb. 24, 1997 (JP) .................................................. 9-039032

(51) Int. Cl.⁷ ........................................................ G06K 5/00
(52) U.S. Cl. ............................ 235/380; 235/382; 235/492
(58) Field of Search ..................................... 235/380, 386, 235/492, 375, 379, 382; 900/26

(56) References Cited

U.S. PATENT DOCUMENTS

| | | |
|---|---|---|
| 4,877,946 * | 10/1989 | Ando et al. ........................... 235/380 |
| 5,204,512 | 4/1993 | Ieki et al. . |
| 5,272,753 | 12/1993 | Nakayama et al. . |
| 5,317,137 * | 5/1994 | Wilkins ................................. 235/380 |
| 5,629,508 | 5/1997 | Findley, Jr. et al. . |
| 5,796,083 * | 8/1998 | Kenneth et al. . |
| 5,828,043 * | 10/1998 | Nicoll et al. .......................... 235/380 |

FOREIGN PATENT DOCUMENTS

| | | |
|---|---|---|
| 426 424 | 5/1991 | (EP) . |
| 1-259479 * | 10/1989 | (JP) . |
| 3-51976 * | 3/1991 | (JP) . |
| 286464 | 9/1996 | (TW) . |

* cited by examiner

Primary Examiner—Mark Tremblay
(74) Attorney, Agent, or Firm—Pillsbury Winthrop LLP

(57) ABSTRACT

A control circuit receives data input by the user through an operable monitor, attaches a data-encoding instruction to the input data, and supplies the instruction-attached input data to an IC card reader/writer. Upon receiving the instruction-attached input data, the IC card reader/writer reads encoding key data stored in an IC card, thereby encoding the data and returning it to the control circuit. The control circuit, in turn, modifies the returned encoded data in the form of communicable data, and supplies a communication circuit with the modified encoded data and an instruction to transmit the data. Upon receiving the modified encoded data and instruction, the communication circuit transmits the modified encoded data to a host computer via a communication line.

5 Claims, 3 Drawing Sheets

IC CARD SYSTEM AND METHOD FOR SECURING THE SYSTEM

This is a division of Application Ser. No. 09/027,616, filed Feb. 23, 1998 abandoned.

BACKGROUND OF THE INVENTION

This invention relates to an IC card system to be used as, for example, a transaction terminal installed in a bank for transmitting data input by the user to a host computer, using an IC card which stores encoding key data, and also to a method for securing the IC card system.

In a transaction terminal installed in a bank, data input by the user, such as a password, an amount of money, etc., is encoded in light of security before it is transmitted to, for example, a host computer. The data input by the user is supplied to a control circuit, where it is encoded using key data stored in a hard disk or a semiconductor element under the control of the control circuit. There is a case where an IC card is used as a semiconductor element which stores encoding key data.

To enhance security, it is necessary to exchange encoding key data with new one after it is used for a certain period of time. If the encoding key data is stored in a hard disk or a semiconductor element on an electric unit, very complicated means must be used to exchange it.

There is a case where encoding is performed by use of an IC card which stores encoding key data and a reader device for reading the data. In this case, the encoding key data can be exchanged with new one very easily in a short time, since it can be done by exchanging only the IC card with another.

However, the encoding key data which can be easily exchanged can be easily stolen and decoded, too.

BRIEF SUMMARY OF THE INVENTION

It is the object of the invention to provide an IC card system protected from data decoding even when an IC card which stores encoding key data is stolen, and a method for securing the system.

According to a first aspect of the invention, there is provided an IC card system for transmitting data to a host computer using an IC card reader/writer which holds an IC card storing encoding information, comprising: input means for inputting data; encoding means provided in the IC card reader/writer for encoding the data input through the input means, using the encoding information stored in the IC card; and transmission means for transmitting, to the host computer, the data encoded by the encoding means.

According to a second aspect of the invention, there is provided an IC card system for transmitting data to a host computer using an IC card which stores first encoding information, comprising: input means for inputting data; first encoding means for encoding the data input by the input means, using second encoding information prestored therein; second encoding means for further encoding the data encoded by the first encoding means, using the first encoding information stored in the IC card; decoding means for decoding the data encoded by the second encoding means, using the second encoding information; and transmission means for transmitting, to the host computer, the data decoded by the decoding means and encoded using only the first encoding information.

According to a third aspect of the invention, there is provided an IC card system for transmitting data to a host computer using an IC card which stores encoding information, comprising: holding means which holds the IC card and performs reading and writing of data; processing means for erasing or rewriting the encoding information stored in the IC card when the IC card is taken out of the holding means; and ejection means for ejecting the IC card after the processing means erases or rewrites the encoding information.

According to a fourth aspect of the invention, there is provided an IC card system for transmitting data to a host computer using an IC card with an IC which stores encoding information, comprising: holding means which holds the IC card and performs reading and writing of data; application means for applying, to the IC of the IC card, a voltage which can destroy the IC, when the IC card is taken out of the holding means; and ejection means for ejecting the IC card from the holding means after the IC of the IC card is destroyed by the voltage from the application means.

According to a fifth aspect of the invention, there is provided a method of securing an IC card system for transmitting data to a host computer using an IC card reader/writer which holds an IC card storing encoding information, comprising the steps of: inputting data; encoding the input data by means of the IC card reader/writer, using the encoding information stored in the IC card; and transmitting the encoded data to the host computer.

According to a sixth aspect of the invention, there is provided a method of securing an IC card system for transmitting data to a host computer using an IC card which stores first encoding information, comprising the steps of: encoding input data using prestored second encoding information; further encoding the encoded data using the first encoding information stored in the IC card; decoding the encoded data using the second encoding information; and transmitting, to the host computer, the data decoded and encoded using only the first encoding information.

According to a seventh aspect of the invention, there is provided a method of securing an IC card system for transmitting data to a host computer using an IC card which stores encoding information, comprising the steps of: erasing or rewriting the encoding information stored in the IC card when the IC card is taken out of holding means which holds the IC card and performs reading and writing of data; and ejecting the IC card from the holding means after the encoding information is erased or rewritten.

According to an eighth aspect of the invention, there is provided a method of securing an IC card system for transmitting data to a host computer using an IC card with an IC which stores encoding information, comprising the steps of: applying, to the IC of the IC card, a voltage which can destroy the IC, when the IC card is taken out of holding means which holds the IC card and performs reading and writing of data; and ejecting the IC card from the holding means after the IC of the IC card is destroyed by the voltage.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described in detail with reference to the accompanying drawings.

Figure 1:
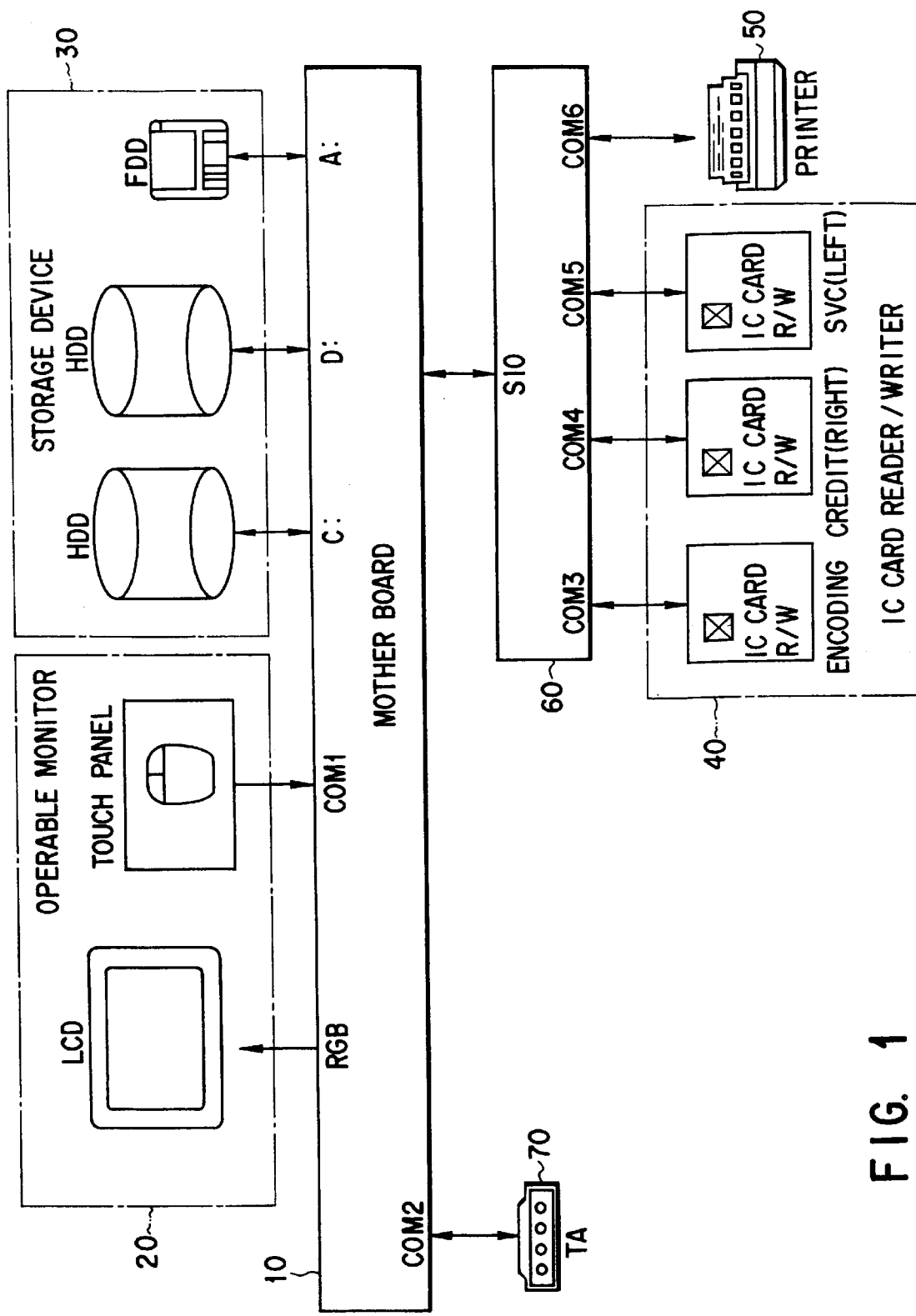
FIG. 1 is a schematic view, showing an IC card system according to the invention.

FIG. 1 is a schematic view, showing an IC card system according to the invention. As is shown in FIG. 1, a mother board 10 as a control circuit board for controlling the overall system comprises an operable monitor 20 including an LCD monitor and a touch panel, a memory device 30 such as a hard disk (HDD), a floppy disk (FDD), etc., an IC card reader/writer 40 which inserts various IC cards, a serial IO (hereinafter referred to as "SIO") 60 connected to a printer 50 for outputting, for example, a journal, and a communication circuit 70 for communicating with a host (not shown).

The IC card reader/writer 40 has sections corresponding to a credit IC card and an IC card as a stored value card (SVC), which are inserted by the user, and to an encoding IC card inserted by the bank clerk.

Figure 2:
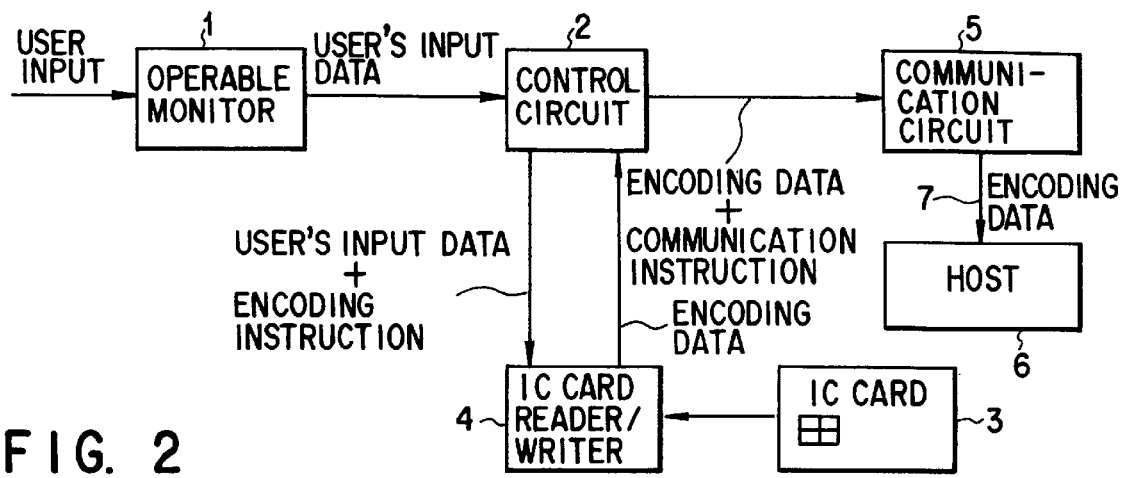
FIG. 2 is a block diagram, showing an IC card system according to a first embodiment of the invention.

FIG. 2 is a schematic view, showing the structure of an IC card system according to the first embodiment. As is shown in FIG. 2, the IC card system of the first embodiment comprises an operable monitor 1 to be operated by the user, a control circuit 2 for controlling the overall system, an IC card 3 storing encoding key data (encoding information), an IC card reader/writer 4 holding the IC card 3, a communication circuit 5 for communicating with an external device, and a host computer (hereinafter referred to simply as a "host") 6 connected to the communication circuit 5 via a communication line 7.

The operation of the IC card system of the first embodiment will be described.

First, the user selects contents of transaction from the menu on the monitor (input means) 1 and inputs his or her password, the amount of money, etc. through the monitor 1. These input data items are supplied to the control circuit 2.

The control circuit (first instruction means) 2 supplies the user's input data items and an instruction to encode them, to the IC card reader/writer 4 inserting the IC card 3 which stores the encoding key data.

The IC card reader/writer (encoding means) 4, in turn, reads the encoding key data from the IC card 3 to encode the user's input data items, and returns the encoded data items to the control circuit 2.

Although in this embodiment, the IC card reader/writer 4 performs encoding, an encoding circuit may be provided in the IC card 3 to make the card perform encoding.

The control circuit (second instruction means) 2 modifies the encoded data items in the form of communicable data, and supplies the communication circuit 5 with the modified encoded data items and an instruction to transmit them.

The communication circuit 5, in turn, transmits the encoded user's data items to the host 6 via the communication line 7.

As described above, in the first embodiment, data input by the user is encoded using encoding key data stored in an IC card, which means that the encoding key data cannot easily be stolen but can easily be changed.

Figure 3:
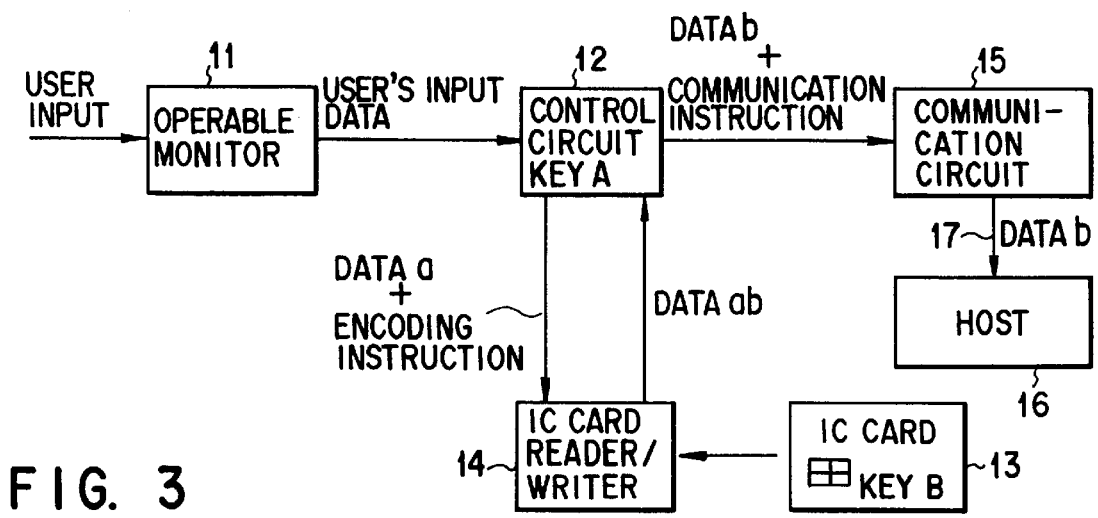
FIG. 3 is a block diagram, showing an IC card system according to a second embodiment of the invention.

FIG. 3 shows an IC card system according to a second embodiment of the invention. The IC card system of this embodiment comprises an operable monitor 11 to be operated by the user, a control circuit 12 for controlling the overall system, which stores dedicated encoding key data (Key) A, an IC card 13 which stores dedicated encoding key data (Key) B, an IC card reader/writer 14 which stores the IC card 13, a communication circuit 15 for communicating with an external device, and a host 16 connected to the communication circuit 15 via a communication line 17.

The operation of the IC card system of the second embodiment will be described.

First, the user selects contents of transaction from the menu on the monitor (input means) 11 and inputs his or her password, the amount of money, etc. through the monitor 11. These input data items are supplied to the control circuit 12.

The control circuit (first encoding means) 12 encodes the user's input data items using prestored encoding key data (second encoding information) A, thereby encoding data a. The circuit 12 then supplies the data a and an instruction to encode it, to the IC card reader/writer 14.

Upon receiving the data a and the data-encoding instruction, the IC card reader/writer 14 reads encoding key data (first encoding information) B from the IC card 13 to encode the data a, and returns resultant data ab to the control circuit 12.

Although in this embodiment, the IC card reader/writer 14 performs encoding, an encoding circuit may be provided in the IC card 3 to make the card perform encoding.

The control circuit (decoding means) 12 decodes the data ab using the prestored encoding key data A, thereby decoding data b equivalent to data encoded by encoding the user's input data using the encoding key data B only. The circuit 12 then modifies the data b in the form of communicable data, and supplies the communication circuit 15 with the modified data b and an instruction to transmit the data b.

Upon receiving the transmission instruction and the data b, the communication circuit (transmission means) 15 transmits, to the host 16 via the communication line 17, the user's input data encoded using the encoding key data B stored in the IC card 13.

As described above, even if in the second embodiment, data transmitted through the communication line connecting the control circuit to the IC card reader/writer is stolen, it cannot be decoded without any of the encoding key data items stored in the control circuit and the IC card. Thus, the second embodiment provides a high security by virtue of the two encoding key data items.

Figure 4:
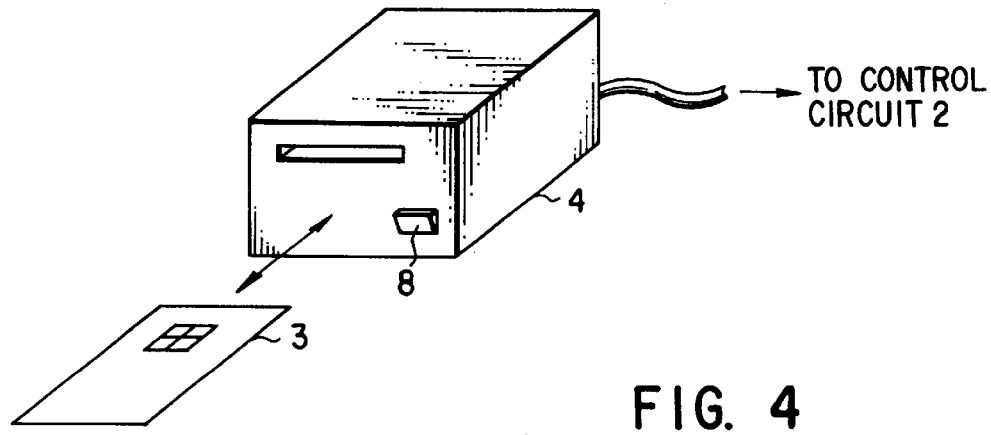
FIG. 4 is a perspective view, showing an IC card reader/writer and an IC card, according to a third embodiment of the invention.

FIG. 4 shows the appearances of an IC card 3 and an IC card reader/writer 4 according to a third embodiment and to be incorporated in the IC card system of the first embodiment shown in FIG. 2. When an eject switch 8 employed in the IC card reader/writer 4 is pushed, the IC card inserted therein is ejected.

Figure 5:
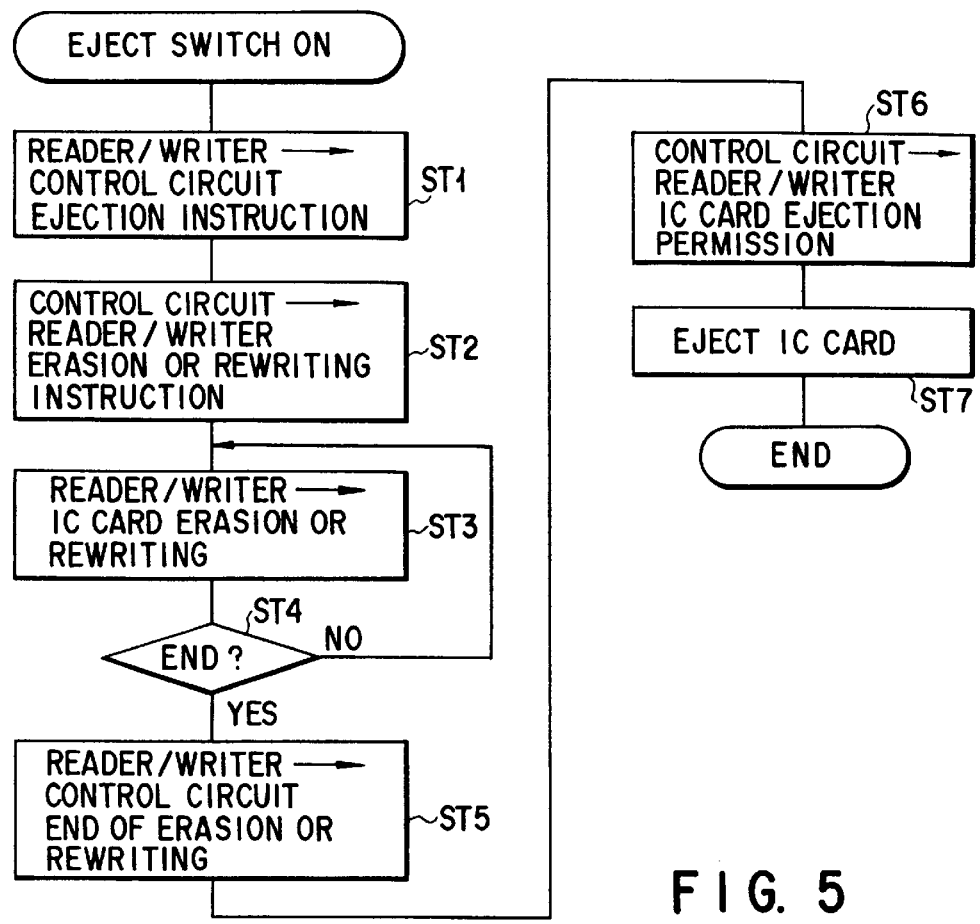
FIG. 5 is a flowchart, useful in explaining the operation of taking the IC card out of the IC card reader/writer.

The operation of ejecting the IC card 3 from the IC card reader/writer 4 according to the third embodiment will be described with reference to the flowchart of FIG. 5.

To take the IC card 3 out of the IC card reader/writer (holding means) 4 employed in the first embodiment, the eject switch 8 of the reader/writer 4 is pushed.

When the eject switch 8 is pushed, the IC card reader/writer 4 supplies the control circuit 2 with an instruction to eject the card 3 (ST1).

The control circuit 2, in turn, supplies the IC card reader/writer 4 with a control instruction to erase or rewrite the encoding key data stored in the IC card 3 (ST2).

The IC card reader/writer (processing means) 4 erases or rewrites the encoding key data stored in the IC card 3 in accordance with the control instruction (ST3 and ST4). After erasing or rewriting of the encoding key data is completed, the IC card reader/writer 4 informs the control circuit 2 of the completion (ST5).

The control circuit 2 then supplies the IC card reader/writer 4 with an instruction to eject the IC card 3 (ST6).

Upon receiving the card-ejecting instruction, the IC card reader/writer (ejection means) 4 ejects the IC card 3 (ST7).

As described above, in the third embodiment, the encoding key data stored in the IC card is erased or rewritten at the time of taking the IC card out of the IC card reader/writer, and therefore the encoding key data is prevented from being forged or stolen.

Figure 6:
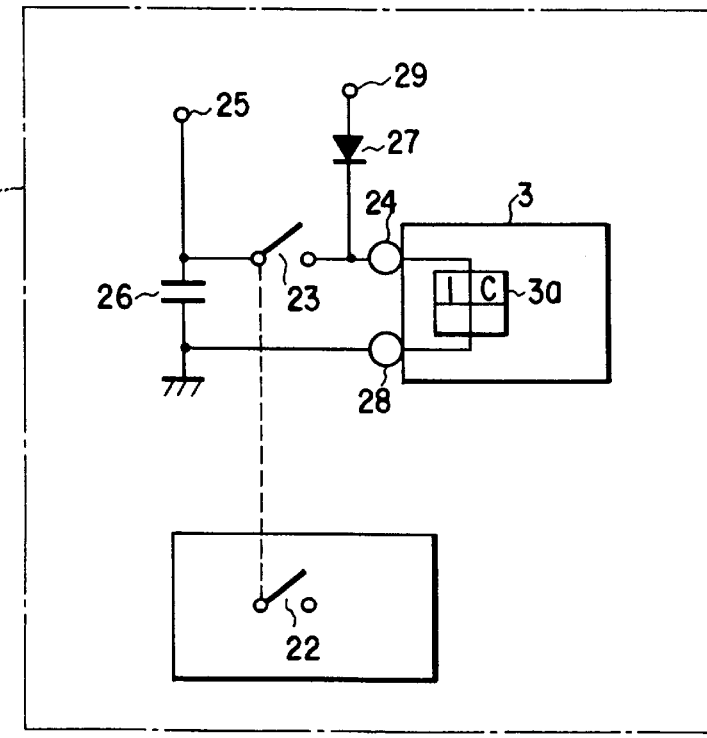
FIG. 6 is a view, showing an additional circuit structure employed in an IC card reader/writer according to a fourth embodiment of the invention.

FIG. 6 shows an additional circuit in an IC card reader/writer according to a fourth embodiment and employed in the FIG. 2 IC card system of the first embodiment. An IC card reader/writer 21 according to the fourth embodiment comprises an eject switch 22, a switch 23 which operates in synchronism with the eject switch 22, a power input terminal 24 for inputting a power to an IC 3a incorporated in the IC card 3, a power supply 25 for destroying the IC 3a of the IC card 3, a charging capacitor 26, an operation power-protecting diode 27, a ground terminal 28 for the IC 3a of the IC card 3, and a power supply 29 for operating the IC card 3.

The charging capacitor 26 is provided for protecting the IC card reader/writer 21 when the power supply of the reader/writer is in the off-state. Further, the operation power-protecting diode 27 is provided for protecting a circuit for controlling the IC card 3 which is normally operating.

The case of taking the IC card 3 out of the IC card reader/writer 21 will now be described. When the eject switch 22 of the IC card reader/writer (holding means) 21 is pushed, the switch 23 operable in synchronism with the eject switch 22 is turned on, thereby applying, to the power input terminal 24 of the IC card 3, the power of the power supply 25 which is sufficient to destroy the IC 3a. As a result, the IC 3a is destroyed. Then, the IC card reader/writer (eject means) 21 ejects the IC card 3.

As described above, in the fourth embodiment, the IC of the IC card is destroyed when the IC card is taken out of the IC card reader/writer. Therefore, forgery or steal of encoding key data stored in the IC card is prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An IC card system for transmitting encoded data to a host computer using an IC card which stores encoding key data for encoding the data, comprising:

holding means which holds the IC card;

means for encoding data using the encoding key data stored in the IC card to generate the encoded data;

means for transmitting the encoded data to the host computer;

means for generating a signal directing the holding means to eject the IC card;

processing means for erasing or rewriting the encoding key data stored in the IC card in response to receiving the signal directing the holding means to eject the IC card;

means for outputting permission information to eject the IC card when the means for erasing/rewriting has completed erasing or rewriting of the encoding key data; and means for receiving the permission information and for ejecting the IC card from the holding means in response thereto.

2. An IC card system for transmitting encoded data to a host computer using an IC card which stores information for encoding the data, comprising:

holding means which holds the IC card;

means for encoding data using the encoding key data stored in the IC card to generate the encoded data;

means for transmitting the encoded data to the host computer;

means for generating a signal directing the holding means to eject the IC card;

application means for applying a voltage large enough to destroy the IC in response to receiving the signal directing the holding means to eject the IC card; and ejection means for ejecting the IC card from the holding means after the voltage has been applied by the application means.

3. A method of securing an IC card system that encodes data using encoding key data stored on an IC card, comprising:

receiving a command to eject the IC card from an IC card reader/writer;

erasing or rewriting the encoding key data stored in the IC card with the IC card reader/writer in response to the received command;

generating a signal indicating permission to eject the IC card when the erasing or rewriting of the encoding information stored in the IC card has completed; and ejecting the IC card from the IC card read/writer in response to the signal indicating permission.

4. A method of securing an IC card system that encodes data using encoding kev data stored on an IC card, comprising:

receiving a command to eject the IC card from an IC card reader/writer;

applying to the IC card in response to the received command, a voltage large enough to destroy the IC card so that the IC card can no longer store encoding key data; and ejecting the IC card from the IC card reader/writer after the voltage has been applied to the IC card.

5. A system for encoding information based on an IC card of the user, comprising:

an IC card reader/writer configured to accept and hold the IC card, the IC card reader/writer reading an encoding key stored on the IC card;

an eject switch connected to the IC card reader/writer, the eject switch, when activated, causing generation of an eject signal; and a control circuit coupled to the IC card reader/writer, the control circuit arranged to receive the encoding key from the IC card reader/writer and encode the information based on the encoding key, and, in response to receiving the eject signal, issuing a control instruction to the IC card reader/writer to erase or rewrite the encoding key stored on the IC card before the IC card is ejected from the IC card reader/writer.

\* \* \* \* \*